United States Patent [19]
Sanford et al.

[11] Patent Number: 4,791,388
[45] Date of Patent: Dec. 13, 1988

[54] CHANNEL WAVEGUIDE MODULATOR

[75] Inventors: Norman A. Sanford, Stillriver; Amaresh Mahapatra, Acton, both of Mass.

[73] Assignee: Polaroid Corporation, Cambridge, Mass.

[21] Appl. No.: 43,190

[22] Filed: Apr. 27, 1987

[51] Int. Cl.$^4$ ................................................ G02B 5/14
[52] U.S. Cl. .................................. 332/7.51; 350/96.14
[58] Field of Search .................... 332/7.51; 350/96.13, 350/96.15, 96.14

[56] References Cited

U.S. PATENT DOCUMENTS

| | | | |
|---|---|---|---|
| 3,753,157 | 8/1973 | Ash et al. | 350/96.14 |
| 3,923,373 | 12/1975 | Dabby et al. | 350/96.14 X |
| 3,990,775 | 11/1976 | Kaminow et al. | 350/96.14 |
| 4,005,927 | 2/1977 | Caton | 350/96.14 |
| 4,145,121 | 3/1979 | Hata et al. | 350/96.14 X |
| 4,166,669 | 9/1979 | Leonberger et al. | 350/96.14 |
| 4,198,115 | 4/1980 | Kaminou | 350/96.14 |
| 4,262,993 | 4/1981 | Bunns et al. | 350/96.14 |
| 4,433,895 | 2/1984 | Puech et al. | 350/96.14 X |

OTHER PUBLICATIONS

Sheem and Tsai, "Light Beam Switching and Modulation using a Built-in Dielectric Channel in LiNbO$_3$ Planer Waveguide", Applied Physics, vol. 17, No. 6, 1978.
"Optical Switching Device Using Leaky Surface Wave" Yamanouchi et al., IEEE Journal of Quantum Electronics, vol. QE-14, No. 11 (1978).
"Leaky-Mode Propagation In Ti-Diffused LiMbO$_3$ and LitaO$_3$ Waveguides", S. K. Sheem et al., Optics Letters, vol. 3, No. 3, Sep. (1978).
"Methods of Characterizing Photorefractive Susceptibility of LiMFO$_3$ Waveguides", R. A. Becker, SPIE, vol. 578, Integrated Optical Circuit Engineering 11 (1985).

*Primary Examiner*—Thomas H. Tarcza
*Assistant Examiner*—Mark Hellner
*Attorney, Agent, or Firm*—Francis J. Caufield

[57] ABSTRACT

An optical modulator comprises a crystal whose top surface includes a channel waveguide whose axis makes an angle with the crystal optic axis larger than the critical angle for TE-polarized leaky mode propagation. An electrode structure overlies the top surface of the crystal for inducing mode conversion of TM-polarized waves propagating in the waveguide to lossy radiation modes.

6 Claims, 1 Drawing Sheet

CHANNEL WAVEGUIDE MODULATOR

FIELD OF THE INVENTION

This invention relates to an optical modulator and more particularly to a channel waveguide optical modulator.

BACKGROUND OF THE INVENTION

An article entitle "Leaking-mode propagation in Ti-diffused LiNbO3 and LiTaO3 waveguides," published in Optics Letters, Vol. 3, No. 3, September 1978, relates the observation of leaking-mode propagation in optical waveguides. In particular, it was reported that anisotropic coupling which occurs between TE and TM polarizations in nonaxial propagation directions causes one of the propagating modes selectively to be leaking, with consequent high propagation losses for such mode. In particular, it was reported that in an X-cut or Y-cut lithium niobate waveguide high propagation loss occurs selectively for only a TE-polarized input. In X-cut or Y-cut lithium tantalate waveguides, the TM-polarized mode is selectively affected instead. In particular, for the effect to be significant, the propagation direction needs to be offset from parallelism with the optic or Z-axis of the crystal by an angle larger than a critical angle for the particular crystal. The critical angle is a function of the waveguide and the particular crystal. It typically may be several degrees and is best determined experimentially for a particular waveguide design. It can be modulated by electric fields set up in the waveguide.

For example, for waveguide angles greater than the critical angle, when a TE-polarized 6328 Angstrom beam was applied as an input to a lithium niobate waveguide for propagating angles along the waveguide greater than the critical angle, there was observed not only the guided beam with TE-polarization, but also a leaking beam, originating along the waveguide but propagating into the substrate with a tilt angle relative to the waveguide surface, and the leaking beam was found to be TM-polarized, rotated 90° from the input beam. No leaking and so no loss was observed for a TM polarized input. A modulator that was designed to harness this effect included a planar optical waveguide placed at an angle to the optic axis of the crystal as close to the crictical angle as feasible. The critical angle was then modulated by electro-optic perturbation to vary the loss of the input TE mode. Because of the necessity of closely controlling the direction of wave propagation to keep it close to the critical angle, the modulator employed a prism coupler to launch accurately the input wave into the waveguide. This technique is accordingly complex and not especially well suited for use with transmission systems in which an optical fiber is used as the principal optical transmission medium.

The present invention is directed at a modulator which is better adapted for use with optical fibers for coupling to the modulator.

SUMMARY OF THE INVENTION

A modulator in accordance with the invention employs a channel waveguide, such as a lithium niobate crystal substrate in which there is diffused a titanium channel waveguide whose axial direction is offset from the optical axis of the crystal by an angle sufficiently larger than the critical angle for clearly exciting the leaking lossy modes of the input wave. This relieves the need for the close tolerance needed in the angle of propagation, as is characteristic of the prior art, and makes it convenient to employ fiber coupling to the input and output ends of the channel. Thereafter, there is supplied an input wave which is polarized to experience little loss in the absence of any perturbing effect and a modulating signal is supplied to an electrode structure on the crystal. This structure serves as a mode converter to perturb electro-optically the input mode for transfer of power to the lossy orthogonal mode.

In one embodiment employing an X-cut titanium-diffused channel lithium niobate crystal, the input beam is a beam polarized in the TM mode for non-lossy propagation and a three-electrode structure is used as a mode converter to perturb this mode for transferring power to the lossy TE mode.

In another embodiment, a Y-cut titanium-diffused channel lithium niobate crystal is supplied with a TE input beam and a two-electrode mode converting structure is used to perturb the input wave and transfer power to the lossy TM mode.

BRIEF DESCRIPTION OF THE DRAWING

The invention will be better understood from the following more detailed description taken with the accompanying drawings wherein:

FIG'S. 1 and 2 show schematically in perspective two different embodiments of cutoff modulators in accordance with this invention.

DETAILED DESCRIPTION

Figure 1:
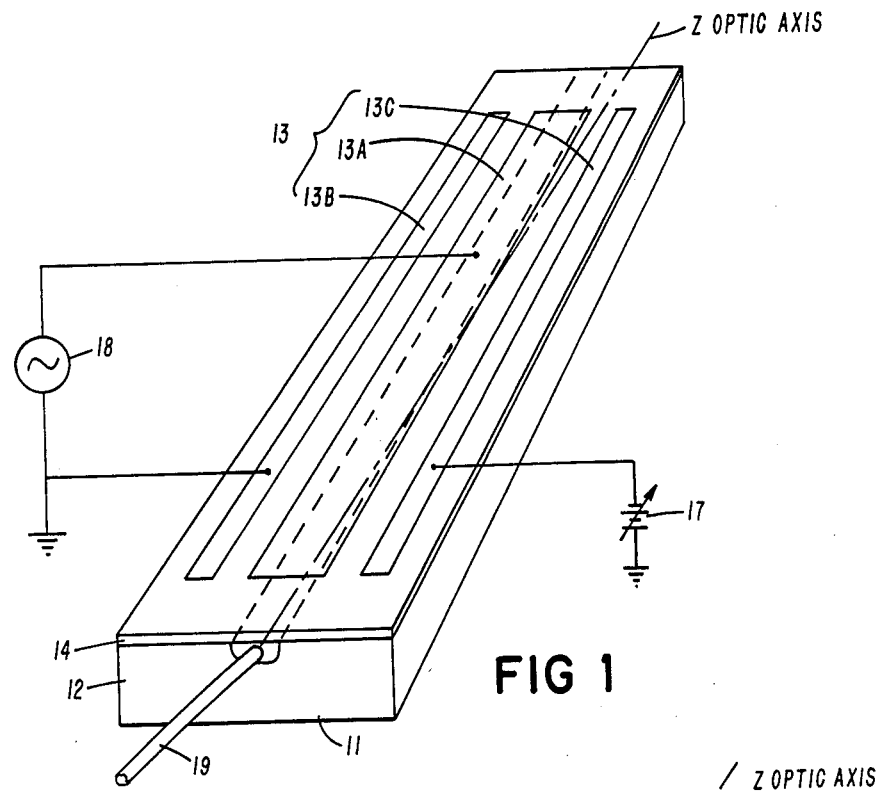

In FIG. 1, the X-cut lithium niobate crystal 11 that serves as the substrate is provided with a straight waveguiding channel 12 about three microns wide and 500 Angstroms deep illustratively formed by titanium diffusion in known fashion, that extends in a direction offset from the optic Z-axis of the crystal by an angle larger than the critical angle for establishing a leaking lossy mode, as discussed above. Typically the offset angle will be between five and seven degrees for characteristic operating conditions and so greater than the expected critical angle. Additionally, there is provided on the crystal surface a three-electrode structure 13 for use as a TE-TM mode converter, of the kind discussed in an article entitled, "Wavelength-independent, optical-damage-immune LiNbO3 TE-TM mode converter" which appeared in Optics Letters, Vol. II, No. 1 in January 1986, pages 39–41. The electrode structure, typically of gold or aluminum, includes a central electrode 13A which overlies along its length the waveguide 12, and a pair of outer parallel electrodes 13B and 13C, disposed symmetrically on opposite sides of the central electrode. Generally, with such an electrode structure it is desirable to include, between the crystal and the electrode structure, means for isolating optically the waveguide from its overlying electrode, typically in the form of a buffer layer 14 under the electrodes, as shown. Such layer may be a magnesium-diffused surface layer, or as described in the above paper, a sputter-deposited silicon dioxide surface layer. Such a layer reduces the propagation loss caused by the central electrode loading by spatially isolating the modal field away from the waveguide surface. Typically, the central electrode will be about 3.5 microns wide and the gap between the central electrode and each outer electrode, also about 3.5 microns wide. The electrode structure advantageously is designed to match the impedance of an a.c. power supply 18 used to drive the electrode structure. Typically, one of the outer electrodes is connected to ground, the other outer electrode is connected either also to ground or alternatively to a d.c. source 17 which is variable so that it can be biased with respect to the grounded electrode to compensate for any misalignment in the three electrodes.

The a.c. drive voltage source 18, which is controlled by the desired modulation, is connected between the central electrode and ground. The frequency of the a.c. voltage is chosen appropriately for the particular modulation application intended. For appropriately high values of drive voltage, essentially complete cutoff of the input wave can be achieved over a relatively short length of waveguide, for example, several millimeters. An optical fiber 19 is shown coupled to the input end of the waveguide for applying an input wave of appropriate polarization. For a lithium niobate crystal, the input wave has a TM-polarization to propagate without significant loss in the absence of any mode conversion initiated by the drive modulation.

Figure 2:
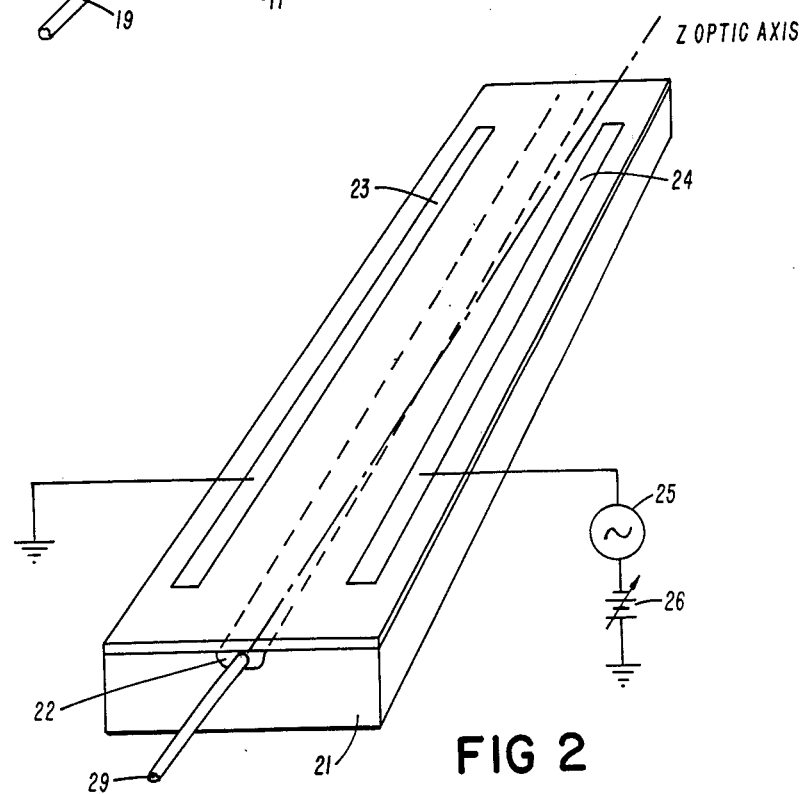

FIG. 2 shows an embodiment employing a simple two-electrode structure for effecting the desired mode conversion. The two-electrode structure is of the kind described in copending application Ser. No. 043,085 having the same assignee and same filing date as this application. To this end, it employs a Y-cut lithium niobate crystal 21 in which there has been formed a channel waveguide 22, advantageously by titanium diffusion in known fashion. As before, the waveguide axis or direction of propagation makes an angle with the optic axis greater than the critical angle for lossy propagation of the mode orthogonal to that of the wave to be supplied as the input to the waveguide. Since the two-electrode structure does not include an electrode over the waveguide, there is relieved the need for the buffer layer included in the embodiment of FIG. 1. The two-electrodes 23 and 24 are disposed symmetrically on opposite side of the waveguide and extend parallel thereto. A gap of about 7 microns between the electrodes is typical for a channel of about 3.5 microns wide. In this instance, one of the electrodes (23) is grounded, and the other is connected to ground by way of the variable d.c. voltage source 25 and the a.c. drive voltage source 26. With this electrode structure, it is important to maintain the operating point at several volts away from ground so the magnitudes of the d.c. voltage and the a.c. voltages should be chosen appropriately. Typically, the d.c. bias may be about twenty volts and the a.c. drive about ten volts. An optical fiber 29 supplies the input TM wave to the input end of the waveguide.

It should be appreciated that the specific designs described are merely illustrative of the general principles of the invention. For example, other crystals, which exhibit similar behavior for off-axis propagation, may be substituted. The suitability of particular materials is best determined empirically. As discussed in the first mentioned paper, in lithium tantalate the properties are reversed. Similarly, the channel waveguide may be formed in other known fashion and inputs of various wavelengths may be substituted.

What is claimed is:
1. An integrated optic modulator comprising:
a z-propagating, ferroelectric crystal substrate having birefringent optical properties that can be varied in response to the application of electric fields, said substrate having formed therein a channel waveguide with effective indices of refraction higher than that of said substrate in two orthogonal planes where the effective index of refraction of said waveguide in one of said orthogonal planes is such that said waveguide provides lossless propagation of light polarized in the same plane and the axis of said waveguide is angularly offset from the optical axis of said substrate by an angle at which the effective index in the other orthogonal plane matches the index of said substrate in the same plane so that light polarized in said other plane of polarization can leak into said substrate; and electrodes on said substrate for selectively applying an electric field thereto to alter the optical properties of said waveguide, said electrodes being positioned on said substrate so that the electric field generated thereby in the presence of an applied voltage thereto changes the effective index of refraction of said leaky mode of polarization so that it no longer matches that of said substrate in the same plane and thereby propagates light polarized in that plane without leaking into said substrate whereby the generation and removal of an electric field via said electrodes provides for the modulation of light.

2. The modulator of claim 1 in which said crystal substrate is a Y-cut lithium niobate crystal and said electrodes comprise a pair symmetrically disposed on opposite sides of said channel waveguide.

3. The modulator of claim 1 in which said crystal substrate is an X-cut lithium niobate crystal and said electrodes are three: a central electrode overlying said channel waveguide and a pair of outer electrodes symmetrically disposed on opposite sides of said central electrode.

4. The modulator of claim 1 in which said crystal substrate is lithium niobate and said channel waveguide is a locally-diffused, titanium-rich region of said crystal substrate and further includes means for supplying an input wave polarized in the TM mode.

5. The modulator of claim 3 in which said crystal substrate is lithium niobate and further includes means for supplying an input wave that is polarized in the TM mode.

6. An optical modulator comprising:
(a) a ferroelectric, X-cut, lithium niobate crystal having predetermined electro-optic properties and a top surface having a channel waveguide for guiding optical modes between input and output ends thereof, the axis of said waveguide being offset from the optical axis of the crystal by an angle greater than the critical angle for leaky mode propagation along one polarization azimuth while otherwise being arranged for providing lossless propagation for orthogonically polarized modes; and
(b) electrodes on said top surface of said crystal for switching between the lossless and leaky modes to convert from the lossless to the leaky mode, said electrodes comprising: a central electrode overlying the waveguide and a pair of outer electrodes symmetrically disposed on opposite sides of the central electrode.

* * * * *